(12) United States Patent
Imasaka

(10) Patent No.: US 6,603,778 B1
(45) Date of Patent: Aug. 5, 2003

(54) ULTRASHORT PULSE LIGHT GENERATING METHOD USING RAMAN RESONATOR AND ITS DEVICE

(75) Inventor: Totaro Imasaka, Fukuoka (JP)

(73) Assignee: Kitakyushu Foundation for the Advancement of Industry, Science and Technology (JP)

( * ) Notice: Subject to any disclaimer, the term of this patent is extended or adjusted under 35 U.S.C. 154(b) by 0 days.

(21) Appl. No.: 09/889,844

(22) PCT Filed: Feb. 1, 2000

(86) PCT No.: PCT/JP00/00535

§ 371 (c)(1), (2), (4) Date: Nov. 8, 2001

(87) PCT Pub. No.: WO00/46892

PCT Pub. Date: Aug. 10, 2000

(30) Foreign Application Priority Data

Feb. 2, 1999 (JP) .......................................... 11-024560

(51) Int. Cl.⁷ ............................................... H01S 3/30
(52) U.S. Cl. .................................. 372/5; 372/3; 372/22
(58) Field of Search ........................... 372/3, 8, 18, 25, 372/29.01, 29.011, 35, 22, 29.016

(56) References Cited

U.S. PATENT DOCUMENTS

| | | | |
|---|---|---|---|
| 4,243,881 A | * 1/1981 | Bethune et al. | 250/338.1 |
| 5,586,132 A | * 12/1996 | Levy | 372/23 |
| 5,682,397 A | * 10/1997 | Scheps | 372/12 |

FOREIGN PATENT DOCUMENTS

| | | | |
|---|---|---|---|
| JP | 64-82584 | 3/1989 | |
| JP | 6-21550 | 1/1994 | |
| JP | 6-29608 | 2/1994 | |
| JP | 9-260762 | 10/1997 | |
| JP | 09-260762 | * 10/1997 | H01S/3/16 |

OTHER PUBLICATIONS

Totaro Imasaka et al., "Generation of Multifrequency Laser Emission by Injection of Two-Color Beam into Dye/Raman Composite Resonator" (Jpn. J. Appl. Phys. Part. 2, vol. 31, No. 9A, Sep. 1, 1992. pp1253-1254).*

Optical Society of America, vol. 23, No. 5, Mar. 1, 1998, pp. 367-369 Continuous-wave Raman laser in $H_2$.

Optical Society of America, vol. 15, No. 6, Jun. 1998, pp. 1667-1673 Performance and design of an off-resonant continuous-wave Raman laser.

Japanese Journal of Applied Physics, vol. 31, No. 9A, Sep. 1, 1992, Pt. 2, Letters, pp. L1253-1254 Generation of Multi frequency Laser Emission by Injection of Two-Color Beam into Dye/Raman Composite Resonator.

J. Light & Vis. Env., vol. 22, No. 2, 198, pp. 1-5 The Generation of Powerful Rainbow-Color Laser Emission by four-wave Raman Mixing for Display and Illumination.

IEEE Journal of Quantum Electronics, Vo. 34, No. 2, Feb. 1998, pp. 260-268 Generation of High-Order Rotational liner in Hydrogen by Four-wave Raman Mixing in the Femtosecond Regime.

* cited by examiner

*Primary Examiner*—Paul Ip
*Assistant Examiner*—Tuan Nguyen
(74) *Attorney, Agent, or Firm*—Lusso, Loud & Kelly

(57) ABSTRACT

An object is provision of a method and apparatus for generating ultrashort optical pulses through use of a Raman resonator, which can generate preferentially rotational Raman lines which resonate within the resonator, which can lower the threshold for generation of rotational Raman lines to thereby increase efficiency, and which enables generation of high-order rotational Raman lines to thereby obtain ultrashort optical pulses. An apparatus for generating ultrashort optical pulses by use of a Raman resonator includes a first laser (101); a second laser (102); a first wavemeter (111) for confirming the emitting wavelength of the first laser (101); a second wavemeter (121) for confirming the emitting wavelength of the second laser (102); and a Raman cell (130). These two laser beams are aligned by a beam splitter (113) to become coaxial and are focused by a lens (124) into the Raman cell (130).

8 Claims, 7 Drawing Sheets

FIG. 1

| n | m | | $\lambda_n$ | $\nu_n = \dfrac{1}{\lambda_n}$ | THE CASE WHERE $l = 17.04\,\mu m$ | |
|---|---|---|---|---|---|---|
| | | | | | $\lambda$ [nm] | $\nu$ [cm$^{-1}$] |
| 1 | $\dfrac{1}{2}$ | | $\dfrac{l}{\frac{1}{2}} = 2l$ | $\dfrac{1}{2l}$ | 34080 | 293.4 |
| 2 | $\dfrac{3}{2}$ | | $\dfrac{l}{\frac{3}{2}} = \dfrac{2}{3}l$ | $\dfrac{1}{\frac{2}{3}l}$ | 11360 | 880.2 |
| 3 | $\dfrac{5}{2}$ | | $\dfrac{l}{\frac{5}{2}} = \dfrac{2}{5}l$ | $\dfrac{1}{\frac{2}{5}l}$ | 6816 | 1467 |
| n | $\dfrac{2n+1}{2}$ | | $\dfrac{l}{\frac{2n+1}{2}} = \dfrac{2}{2n+1}l$ | $\dfrac{2n+1}{2l}$ | | |
| n+1 | $\dfrac{2(n+1)+1}{2}$ | | $\dfrac{l}{\frac{2(n+1)+1}{2}} = \dfrac{2}{2(n+1)+1}l$ | $\dfrac{2(n+1)+1}{2l}$ | | |
| 20 | $\dfrac{2 \times 20+1}{2}$ | | $\dfrac{l}{\frac{2\times 20+1}{2}} = \dfrac{2l}{41}$ | $\dfrac{41}{2l}$ | 831.2 | 12030 |
| 21 | $\dfrac{2 \times 21+1}{2}$ | | $\dfrac{l}{\frac{2\times 21+1}{2}} = \dfrac{2l}{43}$ | $\dfrac{43}{2l}$ | 792.6 | 12620 |
| 22 | $\dfrac{2 \times 22+1}{2}$ | | $\dfrac{l}{\frac{2\times 22+1}{2}} = \dfrac{2l}{45}$ | $\dfrac{45}{2l}$ | 757.4 | 13200 |

F I G. 4
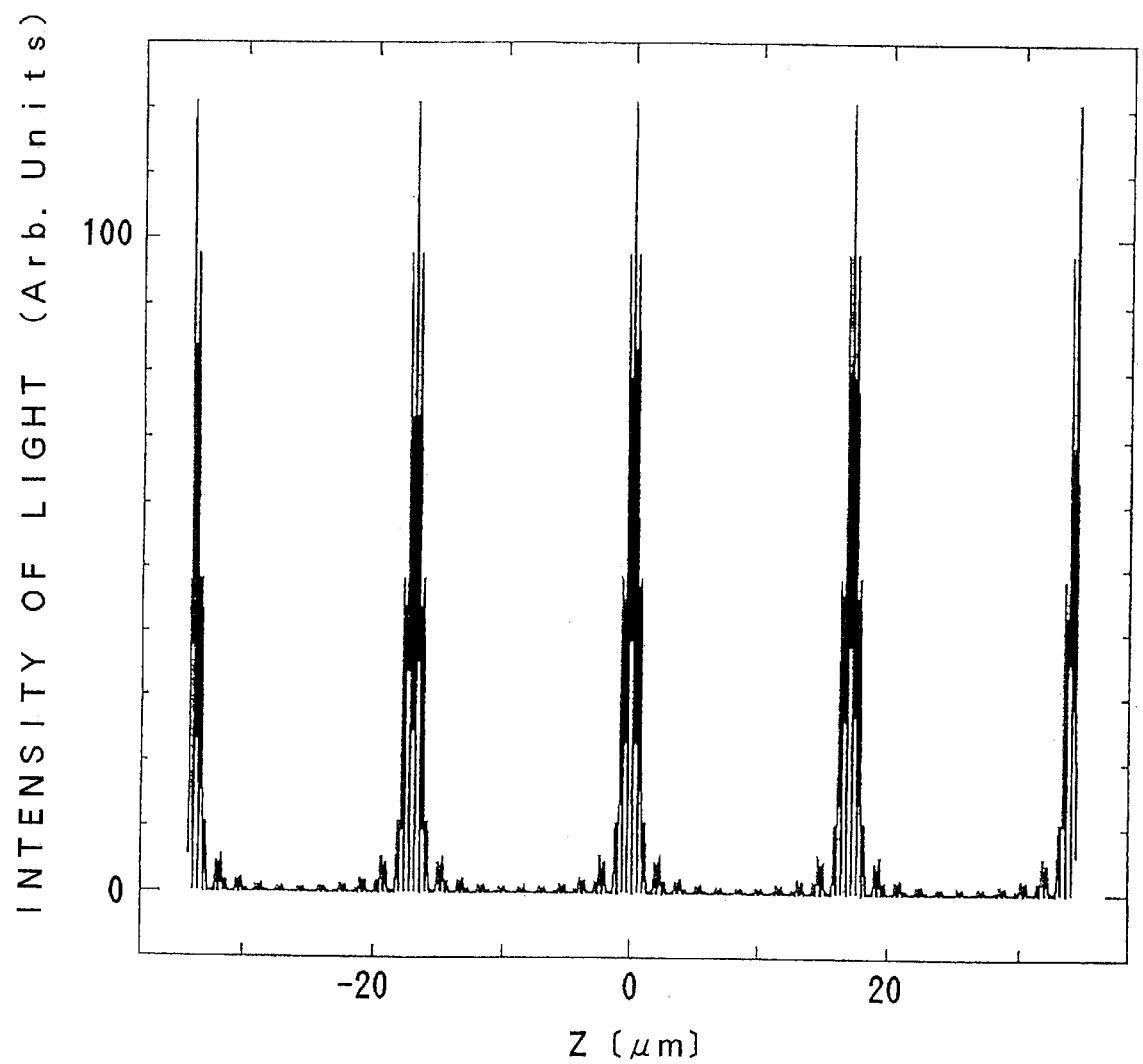

ULTRASHORT PULSE LIGHT GENERATING METHOD USING RAMAN RESONATOR AND ITS DEVICE

CROSS-REFERENCE TO RELATED APPLICATIONS

This application is a National Phase Application (35 USC 371) of PCT/JP00/00535 and claims priority of Japanese Application No. 11-24560 filed Feb. 2, 1999.

TECHNICAL FIELD

The present invention relates to a method and apparatus for continuous generation of a laser beam comprising ultrashort pulses having a pulse width of 1 fs or shorter on the basis of stimulated Raman scattering and four-wave Raman mixing.

BACKGROUND ART

The inventors of the present invention have proposed a method and apparatus for generating ultrashort optical pulses by means of four-wave Raman mixing, as disclosed in (1) Japanese Patent Application Laid-Open (kokai) No. 6-21550 and (2) Japanese Patent Application Laid-Open (kokai) No. 10-133241.

DISCLOSURE OF THE INVENTION

However, such a method of generating ultrashort optical pulses through four-wave Raman mixing requires employment of optical pulses having a high peak as excitation light.

Moreover, in the method, generated Raman light is subjected to pulse compression by use of a Fourier-transform-limited pulse having pulse width and linewidth narrowed to the theoretical limit. Therefore, the problem of easy occurrence of non-linear optical effects such as self-focusing, self-phase modulation, and harmonic generation remains unsolved.

An object of the present invention is to solve the above-described problem and provide a method and apparatus for generating ultrashort optical pulses through use of a Raman resonator, which can generate preferentially rotational Raman lines which resonate within the resonator, which can lower the threshold for generation of rotational Raman lines to thereby increase efficiency, and which enables generation of high-order rotational Raman lines to thereby obtain ultrashort laser pulses.

To achieve the above object, the present invention provides the following:

[1] A method for generating ultrashort optical pulses by use of a Raman resonator, in which a continuous-wave laser of a predetermined frequency, serving as excitation light, is focused into a resonator having a specific resonator length determined by the frequency and is phase-locked in order to generate preferentially rotational Raman lines which resonate within the resonator.

[2] A method for generating ultrashort optical pulses by use of a Raman resonator, in which two laser beams of different colors, which have a predetermined frequency separation therebetween and serve as excitation light, are focused into a resonator having a predetermined resonator length, such that rotational Raman lines are generated within the resonator through four-wave Raman mixing, while vibrating Raman lines are suppressed.

[3] The method for generating ultrashort optical pulses by use of a Raman resonator described in [2] above, characterized in that the predetermined frequency separation is 587 $cm^{-1}$.

[4] An apparatus for generating ultrashort optical pulses by use of a Raman resonator, the apparatus comprising a first laser; a second laser; a first wavemeter for confirming the emitting wavelength of the first laser; a second wavemeter for confirming the emitting wavelength of the second laser; and a Raman cell, two laser beams from the first and second lasers being aligned by a beam splitter to become coaxial and focused by a lens into the Raman cell.

[5] The apparatus for generating ultrashort optical pulses by use of a Raman resonator described in [4] above, characterized in that each of the lasers is a semiconductor laser.

[6] The apparatus for generating ultrashort optical pulses by use of a Raman resonator described in [4] above, characterized in that each of the lasers is a titanium:sapphire laser.

BRIEF DESCRIPTION OF THE DRAWINGS

FIG. 1 is a diagram showing optical waves present within a resonator.

FIG. 4 is a graph relating to the embodiment of the present invention and showing distribution of light intensity within the laser resonator.

BEST MODE FOR CARRYING OUT THE INVENTION

Figure 2:
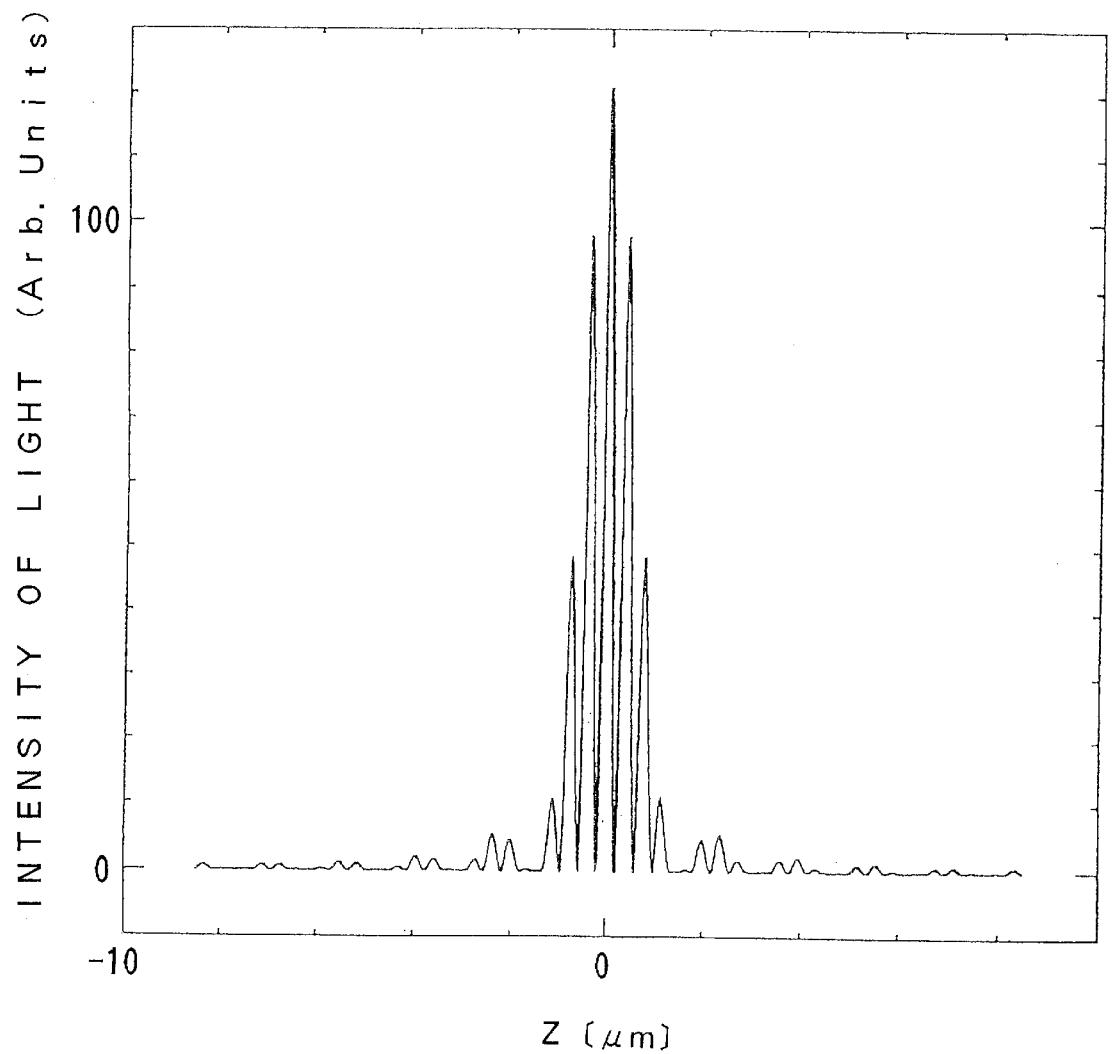
FIG. 2 is a graph relating to an embodiment of the present invention and showing distribution of light intensity within a laser resonator.

An embodiment of the present invention will next be described in detail with reference to the drawings.

As have been described in the background art section, the inventors of the present invention have proposed a method for generating ultrashort optical pulses by means of four-wave Raman mixing. In relation to generation of ultrashort optical pulses, the phenomenon that phase lock occurs automatically has been shown theoretically but not proved experimentally. Further, the generation of ultrashort optical pulses premises use of pulsed light as excitation light, because the generation of ultrashort optical pulses utilizes four-wave Raman mixing, which is a non-linear phenomenon.

Therefore, the generated laser beam includes a single or a plurality of pulses.

Meanwhile, in the method, use of Fourier-transform-limited pulses having pulse width and linewidth narrowed to the theoretical limit is desired. However, generation of such pulses itself is not necessarily easy. Further, when such pulses are compressed to thereby generate a laser beam having a higher peak power, non-linear optical effects such as self-focusing, self-phase modulation, and harmonic generation occur, and generation of target Raman light may be suppressed.

Accordingly, when ultrashort optical pulses are generated by the above-described method, experimental conditions must be selected properly. Moreover, such a laser beam having a high peak power is not necessarily suited for optical communications or similar applications, although it is suitable for nuclear fusion and sophisticated studies on nonlinear optical effects. In other words, a high-repetition-rate laser based on a continuous-wave laser is desirably used for optical communications or similar applications.

However, up to now, no idea has been proposed for generation of a continuous-wave Raman laser including high-repetition-rate ultrashort pulses.

Recently, Professor Carlsten, et al. of Montana State University have reported that when a continuous-wave YAG laser beam emitting at 532 nm is focused into a resonator filled with hydrogen, a stimulated Raman beam is generated due to vibration of hydrogen molecules. This is described in the following papers.

(1) J. K. Brasseur, K. S. Repasky, and J. L. Carlsten, Opt. Lett., 23, 367 (1998).

(2) K. S. Repasky, J. K. Brasseur, L. Meng, and J. L. Carlsten, J. Opt. Soc. Am. B, 15, 1667 (1998).

This finding demonstrates that stimulated Raman scattering—which has conventionally required strong excitation light—can be generated, through continuous-wave laser excitation and by use of a resonator of high reflectivity.

The present invention enables generation of a Raman laser beam having characteristics described below, through utilization of such a resonator structure and through addition of special conditions.

(1) When the frequency of a continuous-wave laser beam is set to a predetermined value, which will be described later, the laser beam is used as excitation light, and the length of the resonator is set to a predetermined value, which will be described later:

(a) rotational Raman lines which resonate within the resonator can be generated preferentially (while vibrating Raman lines are suppressed), whereby high-order rotational Raman lines can be generated; and (b) the threshold for generation of rotational Raman lines can be decreased to thereby increase the generation efficiency.

(2) When two excitation beams of different colors having a separation of 587 $cm^{-1}$ therebetween are introduced, and a four-wave Raman mixing process is used:

(a) vibrating Raman lines can be suppressed, and rotational Raman lines can be generated preferentially; and (b) the threshold for generation of rotational Raman lines can be decreased to thereby increase the generation efficiency, whereby high-order rotational Raman lines can be generated.

(3) When the above-described (1) and (2) are combined, high-order rotational Raman lines can be generated efficiently, and ultimately-short optical pulses can be generated through utilization of the phenomenon that the phases of the high-order rotational Raman lines are locked.

Next, the present invention will be described in detail.

[1] First, standing waves within a resonator will be described.

FIG. 1 shows optical waves present in a resonator.

FIG. 1 describes the relationship among the modes, wavelengths, and wave numbers of laser emission lines.

As is sequentially illustrated from the top, a different optical wave whose wavelength is set such that the length of the resonator corresponds to a half wavelength, one and a half wavelengths, etc. is present in the resonator. Character "n" represents an integer (serial number), and character "m" represents the number of waves (semi-integer) which are present within the resonator. The wavelength $\lambda$ and the wave number $\nu$ of each wave are shown in the right-hand columns. Here, each wave is present in the resonator such that the crest of the wave corresponds to the center of the resonator. In the resonator, only such a standing wave can exist.

A restriction is imposed such that the wave number interval between a wave of a certain order and a wave of an adjacent order becomes 587 $cm^1$, which is the rotational Raman shift frequency of ortho-hydrogen. Thus, the length of the resonator is defined to be 17.04 μm. Values of the wavelength $\lambda$ and the wave number $\nu$ of each wave under such conditions are shown in FIG. 1. When the value of n is 20, 21, or 22, the wavelength $\lambda$ of an optical wave approaches 800 nm. These optical waves can be generated by use of a titanium:sapphire laser or a semiconductor laser. As seen from the column for wave number $\nu$, the wave number interval between a wave of a certain order and a wave of an adjacent order becomes 587 $cm^{-1}$, as expected.

Ten waves (corresponding to ten rotational Raman lines separated 587 $cm^{-1}$ from one another) are conceivably produced in the vicinity of n=21. When the ten waves are superposed and the amplitude is squared (light intensity), the results as shown in FIG. 2 are obtained. The results shown in FIG. 2 are for the case of the resonator having a length of 17.04 μm. Since under the above-described conditions the crest of a wave always corresponds to the center of the resonator, the crest portion is emphasized, resulting in generation of a single sharp peak.

Figure 3:
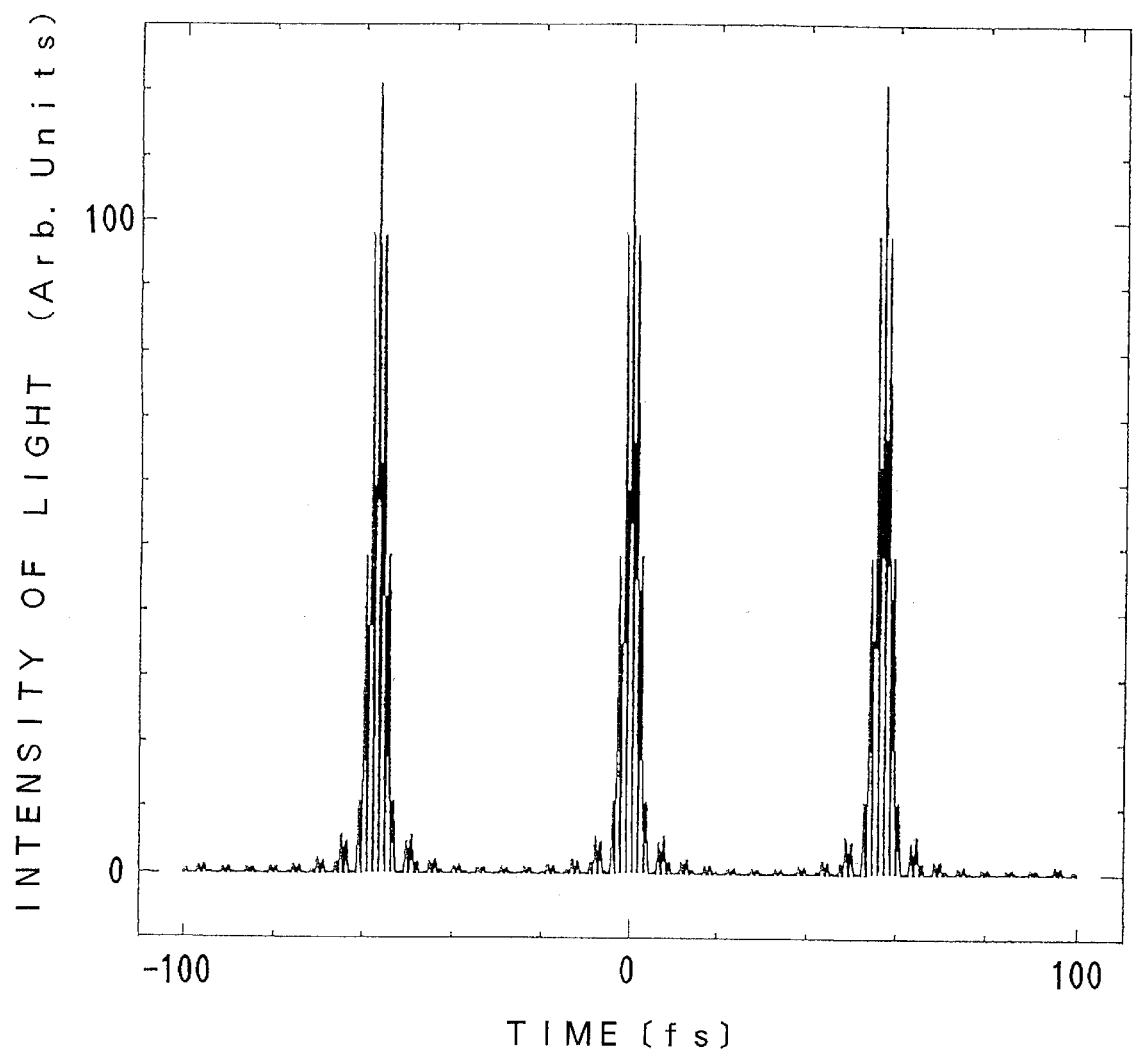
FIG. 3 is a graph relating to the embodiment of the present invention and showing variation with time in light intensity as measured at the center of the laser resonator.

FIG. 3 shows the results of a measurement in which variation with time in intensity of an optical wave was measured at the center (Z=0) of the resonator. There was observed a wave which has a peak every 57 fs, which is the reciprocal of a beat frequency of the rotational Raman lines. The results shown in FIG. 3 are for the case of the resonator having a length of 17.04 μm.

In the case of the published paper of Professor Carlsten, et al. (the above-described prior art document (2)), the length of the resonator is set to about 3 inches (76 mm), which differs greatly from the 17.04 μm employed here. Even though the resonator is of short length and the interaction length (confocal distance) decreases by a tight beam focus of a laser beam, the laser light density increases and thereby the gain of Raman light generation is expected not to change greatly. However, an experiment is desirably performed under conditions as close as possible to those in the published paper. That is, employment of the same conditions makes the experiment more reliable.

In view of the above, the length of the resonator is set to 3.408 mm, which is an integral multiple; i.e., 200 times 17.04 μm. In this case, light propagates through the resonator every time the wave number changes 587/200 $cm^{-1}$. However, no problem arises, because each generated optical wave whose wave number is an integral multiple of 587 $cm^{-1}$ can propagate through the resonator.

FIG. 4 shows a composite wave obtained when ten rotational lines were generated under such conditions. Notably, the results shown in FIG. 4 are for the case of the resonator having a length of 3.408 mm.

In this case, a large number of peaks are observed in the resonator. However, the periodicity of 17.04 μm (57 fs) remains unchanged, and the characteristics of an output laser beam are the same as those in the previously mentioned case. Similar results are obtained even when the length of the resonator is set to 68.16 mm, which is 20 times 3.408 mm.

[2] Next, phase lock will be described.

For generation of ultrashort optical pulses, the phases of waves must coincide with one another at a certain location at a specific time. For example, measures must be taken such that the crest of each wave arrives at the center of the resonator at time t=0. The reason why ultrashort optical pulses are generated as shown in FIG. 3 is that such a measure has been taken in advance. For such a purpose, generally a phase locking element (mode locker) is used. For example, an optical element which can change transmissivity periodically is inserted into the resonator. However, in the present invention, since the period of optical pulses is as short as 57 fs, increasing and decreasing the gain at the time interval by use of ordinary electronics is extremely difficult.

In view of the foregoing, the following two methods are used.

Figure 5:
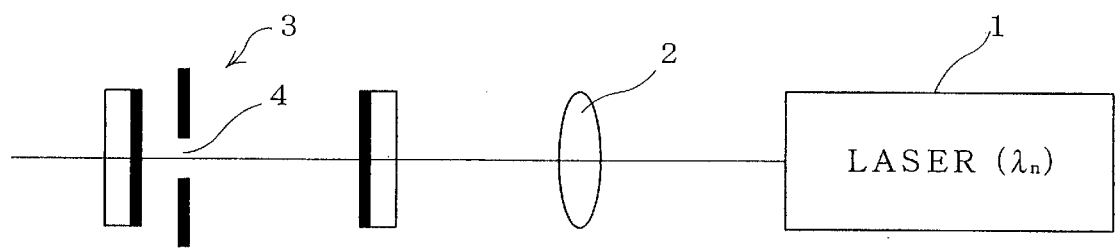
FIG. 5 is a diagram relating to the embodiment of the present invention and showing an optical arrangement for passive phase lock.

(a) Passive phase lock (passive mode lock):

FIG. 5 is a diagram relating to the embodiment of the present invention and showing an optical arrangement for passive phase lock.

In FIG. 5, reference numeral 1 denotes a laser ($\lambda_n$) 2 denotes a lens; 3 denotes a resonator; and 4 denotes a pinhole.

As shown in FIG. 5, the pinhole 4 or the like is inserted into the resonator 3. When laser oscillation occurs and light intensity increases, an optical Kerr lens effect occurs, so that a medium serves as a lens. Alternatively, it may be considered that expansion of a beam is suppressed through self-focusing (in some case the beam may be expanded). Therefore, the state of beam propagation varies, and loss of the laser beam is produced due to the pinhole 4. Due to this effect, the peak power increases and decreases periodically, so that the system becomes unstable. Through adjustment of laser output power, hydrogen pressure, and other conditions of the resonator, the output power can be increased and decreased at a period of 57 fs.

Phase lock is performed by means of this effect. This technique is called optical Kerr lens phase lock and is already used practically in, for example, generation of a femtosecond titanium:sapphire laser beam; and the mechanism of the optical Kerr lens phase lock has been elucidated. This method has an advantage in that an apparatus to be used can be made relatively simple, and phase lock can be effected through condition setting only.

(b) Active phase lock (active mode lock):

The above-described method has drawbacks in that the method requires conditions that enable phase locking, and in some cases such conditions cannot be established, due to the configuration of an apparatus to be used. Therefore, it is desired to forcedly perform phase locking as will be described below.

Figure 6:
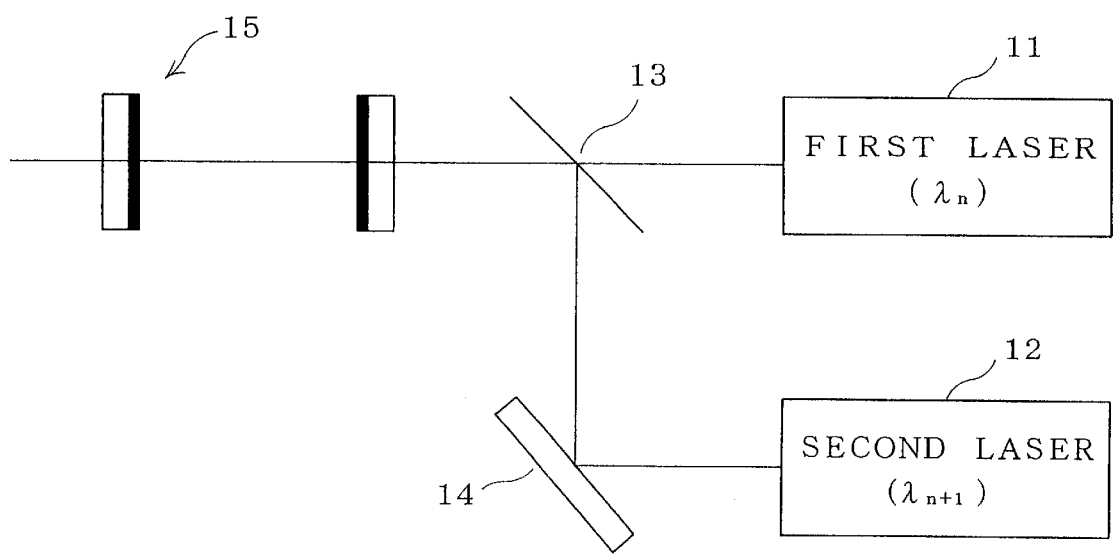
FIG. 6 is a diagram relating to the embodiment of the present invention and showing an optical arrangement for active phase lock.

FIG. 6 is a diagram relating to the embodiment of the present invention and showing an optical arrangement for active phase lock.

In FIG. 6, reference numeral 11 denotes a first laser ($\lambda_n$); 12 denotes a second laser ($\lambda_{n+1}$); 13 denotes a beam splitter; 14 denotes a mirror; and 15 denotes a resonator.

Figure 7:
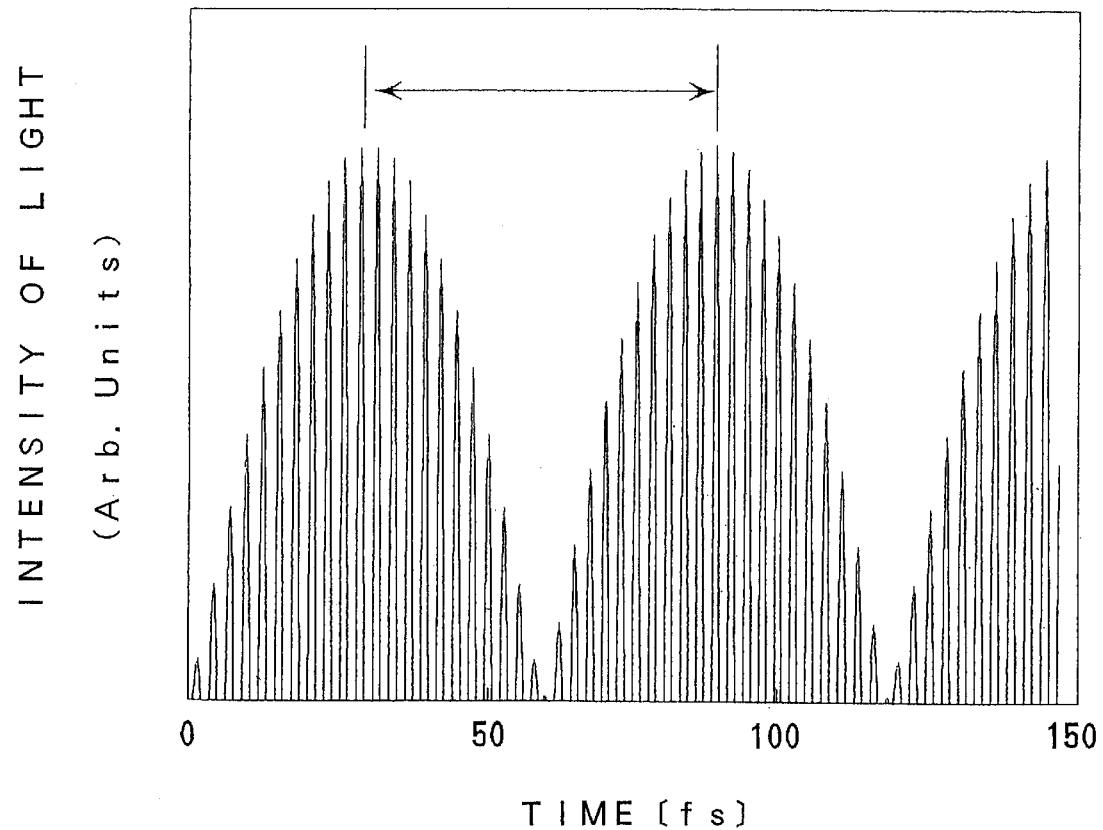
FIG. 7 is a graph relating to the embodiment of the present invention and showing a beat waveform obtained through superposition of two laser beams.

In the method shown in FIG. 6, the first and second lasers 11 and 12 which emit laser beams having designated wavelengths and having a wave number difference of 587 cm$^{-1}$ therebetween are used as excitation light sources. FIG. 7 shows a composite waveform obtained as a result of composition of these laser beams. That is, the intensity of light increases periodically every 57 fs, by which phase locking is effected. This beat waveform itself is not very sharp. However, through periodic amplification (modulation) of oscillated light within the resonator, phase locking is effected, with the result that a sharp pulse waveform can be obtained.

Although this method has a disadvantage in that two excitation lasers are required, and adjustment of optical axis is not easy, this method has an advantage in that phase locking can be performed forcedly irrespective of conditions.

[3] Comparison between the method of the present invention and the conventional method:

The method of generating ultrashort optical pulses by use of a Raman resonator according to the present invention has the following features, as compared with the method of Carlsten et al.

(1) The present method premises generation of rotational Raman lines.

(2) The method utilizing two lasers can generate only rotational Raman lines with higher efficiency and at lower threshold, because the method does not utilize simulated Raman scattering, which is not efficient, but utilizes four-wave Raman mixing, which is highly efficient.

(3) Phase lock effect enables generation of ultrashort optical pulses.

[4] Next, an apparatus for generating ultrashort optical pulses according to the present invention will be described.

Figure 8:
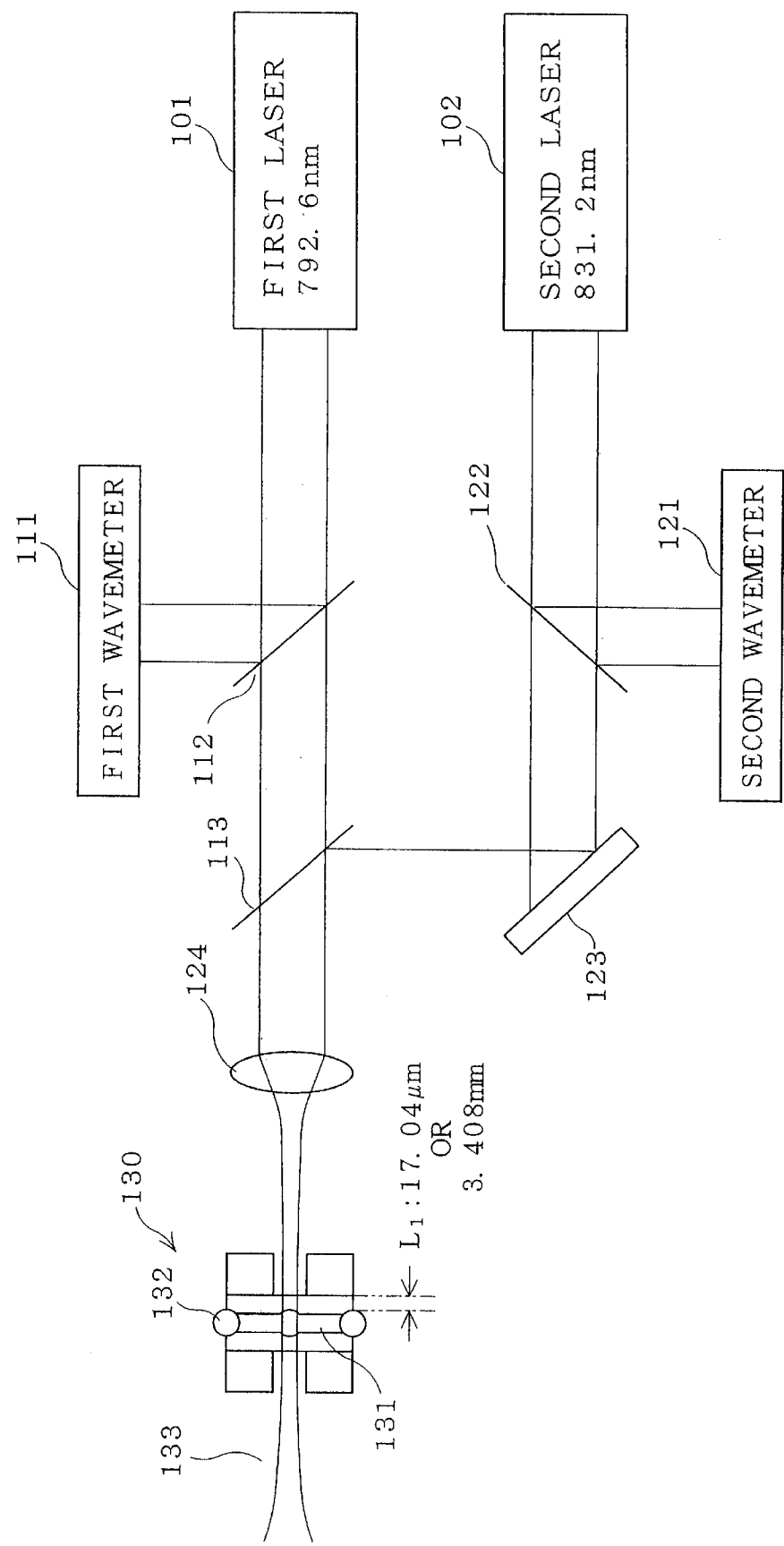
FIG. 8 is a block diagram relating to the embodiment of the present invention and showing the structure of an apparatus for generating ultrashort pulses.

FIG. 8 is a block diagram relating to the embodiment of the present invention and showing the structure of an apparatus for the generation of ultrashort pulses.

In FIG. 8, reference numeral 101 denotes a first laser; 102 denotes a second laser; 111 denotes a first wavemeter; 112, 113, and 122 each denote a beam splitter; 121 denotes a second wavemeter; 123 denotes a mirror; 124 denotes a lens; 130 denotes a Raman cell; 131 denotes pressurized hydrogen; 132 denotes an O-ring; and 133 denotes a vacuum section.

(1) The wavelength of each of the first and second lasers 101 and 102 is set to any one of wavelengths shown in FIG. 1 (for example, the wavelengths of the first and second lasers 101 and 102 are set to 792.6 nm and 831.2 nm, respectively). In practice, a semiconductor laser is preferably used for the first and second lasers 101 and 102. However, an experiment can be performed with ease through use of a titanium:sapphire laser, because of good transverse mode, high output power, and stability of wavelength.

(2) The oscillation wavelengths of the first and second lasers 101 and 102 are confirmed by use of the first and second wavemeters 111 and 121.

(3) The two laser beams are aligned by means of the beam splitter 113 on the same axis and are focused into the Raman cell 130 by use of the lens 124.

(4) In order to reduce loss, the resonator mirror desirably has a slightly concave shape. An experiment may be performed while the reflectivity R of the resonator is increased to about 99.9985% as in the case of Carlsten, et al. However, when the time required to propagate forward and backward within the resonator becomes excessive, due to dispersion of hydrogen molecules, the pulse width may increase and efficiency may decrease. Therefore, here, an experiment is performed while the reflectivity R of the resonator is decreased to about 99%. In such a case, the output power of the excitation laser is increased from a few mW to a few hundreds of mW to thereby prevent decrease in gain.

(5) A light transmission portion of the resonator made of glass is thinned to less than 1 mm. This suppresses the influence of dispersion of light by glass. The cross-sectional area of that portion is made less than 1 mm$^2$, so that the glass portion can sustain the pressure of hydrogen up to ca. 10 atm.

(6) When air is present in a space which the laser beam reaches after passage of the resonator, the pulse width increases due to dispersion in air. In order to eliminate this adversary effect, the space at the rear of the resonator is preferably made a vacuum.

A method which utilizes the rotational Raman level of ortho-hydrogen has been described. However, the present invention can utilize para-hydrogen instead of ortho-hydrogen. In this case, since the Raman shift frequency becomes 354 cm$^{-1}$, the interval of pulse train increases to 97 fs, so that the generated pulses can be used more easily. However, the pulse width increases when the number of Raman lines is restricted to the same number to the case of ortho-hydrogen.

The method utilizing para-hydrogen provides more preferable results at lower temperature, because at low temperature the number of molecules at the ground state increases and gain increases. However, production of para-hydrogen requires a special refrigerator.

Meanwhile, a similar experiment may be performed by use of the vibrational level of hydrogen. In this case, since the Raman shift frequency becomes 4155 cm$^{-1}$, the interval of pulse train decreases to 8 fs. This method is suitable for generation of shorter optical pulses. However, the width of such pulses not greater than 1 fs cannot be measured easily by use of a present technique. Other Raman media other than hydrogen may be used. For example, heavy hydrogen, nitrogen, oxygen, and methane may be used. However, since their Raman gains are small, their use is limited to special applications.

Since the method of the present invention enables ultrashort optical pulses to be generated at a high repetition rate; e.g., a few tens of THz, the method is expected to be applied to ultra-high-speed optical communications. Further, the method is expected to be used for investigation of ultra-fast phenomena or studies on non-linear optical effects, or to be used as seed light for generation of a ultra-high-peak-power laser beam.

When the mirror of the Raman resonator is thick or the length of an optical path in air is long, the phases of the respective oscillation lines deviate from one another due to dispersion at the mirror or in air, so that ultrashort optical pulses are not generated. However, even in such a case, the present invention can be used to generate a continuous-wave multi-color laser beam used for display, laser show, or the like.

The present invention is not limited to the above-described embodiment. Numerous modifications and variations of the present invention are possible in light of the spirit of the present invention, and they are not excluded from the scope of the present invention.

As have been described in detail, the present invention achieves the following effects.

(A) Rotational Raman lines which resonate within the resonator can be generated preferentially.

(B) The threshold for generation of rotational Raman lines can be decreased to thereby increase the generation efficiency; and the high-order rotational Raman lines can be generated in order to obtain ultrashort optical pulses.

INDUSTRIAL APPLICABILITY

The method and apparatus for generating ultrashort optical pulses through use of a Raman resonator according to the present invention are expected to be applied to ultra-high-speed optical communications. Further, the method and apparatus are expected to be used for investigation of ultra-fast phenomena or studies on non-linear optical effects, or to be used as seed light for generation of a ultra-high-peak-power laser beam.

What is claimed is:

1. A method for periodically generating ultrashort multifrequency optical pulses by use of a Raman resonator comprising the steps of:

injecting a continuous-wave laser beam of a predetermined frequency, serving as excitation light, into a resonator having a specific resonator length and containing a Raman frequency shifting medium having a rotational Raman shift frequency, generating a plurality frequencies from the injected beam by the Raman frequency shifting medium, said predetermined frequency and said resonator length being respective multiples of the rotational shift frequency and a corresponding wavelength of the rotational shift frequency in order to generate preferentially the plurality of frequencies as multiples of the rotational Raman shift frequency and which resonate within the resonator while frequencies generated by vibrating Raman shifting are suppressed, and phase locking the generated plurality of frequencies to periodically generate the ultrashort multifrequency optical pulses in accordance with a beat frequency between the generated plurality of frequencies.

2. A method for periodically generating ultrashort multifrequency optical pulses by use of a Raman resonator comprising the steps of:

injecting two laser beams of different colors, which have a predetermined frequency separation therebetween and serve as excitation light, into a resonator having a predetermined resonator length and containing a Raman frequency shifting medium having a rotational Raman shift frequency, periodically generating the ultrashort multifrequency optical pulses within the resonator through four-wave Raman mixing, said colors of the injected laser beams and said resonator length being respective multiples of the rotational Raman shift frequency and a wavelength of the rotational Raman shift frequency such that frequencies generated by vibrating Raman shifting are suppressed and the optical pulses are generated in accordance with a beat frequency of the injected and generated frequencies.

3. A method for periodically generating ultrashort multifrequency optical pulses by use of a Raman resonator according to claim 2, wherein the predetermined frequency separation is 587 cm$^{-1}$.

4. An apparatus for periodically generating ultrashort multifrequency optical pulses by use of a Raman resonator, the apparatus comprising:

(a) a first laser for generating a first beam having first wavelength;

(b) a second laser for generating a second beam having a second wavelength;

(c) a first wavemeter for confirming the emitting wavelength of the first laser;

(d) a second wavemeter for confirming the emitting wavelength of the second laser; and (e) a Raman cell having a predetermined length for receiving the first and second laser beams output from the first and second lasers, (f) a beam splitter for coaxially aligning the first and second beams received by the Raman cell, and (g) a lens for focusing the aligned first and second beams into the Raman cell, wherein the predetermined length of the Raman cell and the first and second wavelengths are respective multiples of a rotational shift wavelength of the Raman cell.

5. An apparatus for periodically generating ultrashort multifrequency optical pulses by use of a Raman resonator according to claim 4, wherein each of the first and second lasers is a semiconductor laser.

6. An apparatus for periodically generating ultrashort multifrequency optical pulses by use of a Raman resonator according to claim 4, wherein each of the first and second lasers is a titanium:sapphire laser.

7. A method for periodically generating ultrashort multifrequency optical pulses by use of a Raman resonator according to claim 2 wherein the two laser beams of different colors are continuous laser beams.

8. An apparatus for periodically generating ultrashort multifrequency optical pulses by use of a Raman resonator according to claim 4 wherein the first and second beams generated by the first and second lasers are continuous laser beams.

* * * * *

UNITED STATES PATENT AND TRADEMARK OFFICE
CERTIFICATE OF CORRECTION

PATENT NO. : 6,603,778 B1
DATED : August 5, 2003
INVENTOR(S) : Imasaka

It is certified that error appears in the above-identified patent and that said Letters Patent is hereby corrected as shown below:

Column 4,
Line 14, "$cm^1$" should read -- $cm^{-1}$ --.

Column 8,
Line 53, "$crn^{-1}$" should read -- $cm^{-1}$ --.

Signed and Sealed this

Sixteenth Day of March, 2004

JON W. DUDAS
*Acting Director of the United States Patent and Trademark Office*